(12) United States Patent
Arima et al.

(10) Patent No.: US 9,663,141 B2
(45) Date of Patent: May 30, 2017

(54) VEHICULAR STEERING SYSTEM

(71) Applicant: JTEKT CORPORATION, Osaka-shi, Osaka (JP)

(72) Inventors: Masanori Arima, Nara (JP); Yasuhiko Hasuda, Kashihara (JP); Keita Nimura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/184,435

(22) Filed: Jun. 16, 2016

(65) Prior Publication Data

US 2016/0375930 A1    Dec. 29, 2016

(30) Foreign Application Priority Data

Jun. 26, 2015   (JP) .................................. 2015-129280

(51) Int. Cl.
| | | |
|---|---|---|
| *B62D 5/06* | (2006.01) | |
| *B60K 7/00* | (2006.01) | |
| *B62D 5/00* | (2006.01) | |
| *B62D 3/14* | (2006.01) | |
| *B62D 5/08* | (2006.01) | |
| *B62D 5/10* | (2006.01) | |

(52) U.S. Cl.
CPC ............ *B62D 5/062* (2013.01); *B60K 7/0007* (2013.01); *B62D 3/14* (2013.01); *B62D 5/00* (2013.01); *B62D 5/08* (2013.01); *B62D 5/10* (2013.01)

(58) Field of Classification Search
CPC ......... B60K 7/0007; B62D 3/14; B62D 5/064
See application file for complete search history.

(56) References Cited

U.S. PATENT DOCUMENTS

2014/0345965 A1\* 11/2014 Ura ..................... B62D 5/0835
                                                        180/404

FOREIGN PATENT DOCUMENTS

| EP | 2801509 A2 | 11/2014 |
|---|---|---|
| EP | 2805871 A2 | 11/2014 |
| EP | 2805872 A1 | 11/2014 |
| GB | 2345895 A | 7/2000 |
| JP | 2010-023809 A | 2/2010 |
| JP | 2012-158311 A | 8/2012 |
| JP | 2013-112102 A | 6/2013 |
| JP | 2013-147084 A | 8/2013 |

OTHER PUBLICATIONS

Nov. 22, 2016 extended Search Report issued in European Patent Application No. 16175509.5.

\* cited by examiner

*Primary Examiner* — Kevin Hurley
(74) *Attorney, Agent, or Firm* — Oliff PLC (57) ABSTRACT

A vehicular steering system includes a driving wheel, a wheel drive actuator that rotationally drives the driving wheel, a steering operation mechanism that steers the driving wheel, a steering operation actuator that applies a steering operation force that is used to steer the driving wheel to the steering operation mechanism, and a hydraulic circuit that transmits the rotational driving force of the wheel drive actuator to the steering operation mechanism via hydraulic oil as a steering operation force.

4 Claims, 4 Drawing Sheets

VEHICULAR STEERING SYSTEM

INCORPORATION BY REFERENCE

The disclosure of Japanese Patent Application No. 2015-129280 filed on Jun. 26, 2015 including the specification, drawings and abstract, is incorporated herein by reference in its entirety.

BACKGROUND OF THE INVENTION

1. Field of the Invention

The invention relates to a vehicular steering system.

2. Description of the Related Art

Japanese Patent Application Publication No. 2013-112102 (JP 2013-112102 A) discloses an automobile including driving wheels, a steering operation mechanism that can independently steer the driving wheels, and a wheel drive motor (wheel drive actuator) that rotationally drives the driving wheels. The steering operation mechanism includes a steering operation motor (steering operation actuator) and a transmission mechanism that transmits rotation of the steering operation motor to the driving wheels.

The configuration in Japanese Patent Application Publication No. JP 2013-112102 A needs to allow the steering operation actuator to generate high power, for example, during stationary steering when the driving wheels are steered while the vehicle is stopped. Thus, the steering operation actuator needs to provide high power.

SUMMARY OF THE INVENTION

An object of the invention is to provide a vehicular steering system in which power required to be provided by the steering operation actuator is reduced.

According to an aspect of the invention, a vehicular steering system includes a driving wheel, a wheel drive actuator that applies a rotational driving force to the driving wheel, a steering operation mechanism that steers the driving wheel, a steering operation actuator that applies a steering operation force that is used to steer the driving wheel to the steering operation mechanism, and a hydraulic circuit that transmits the rotational driving force of the wheel drive actuator to the steering operation mechanism via hydraulic oil as a steering operation force.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
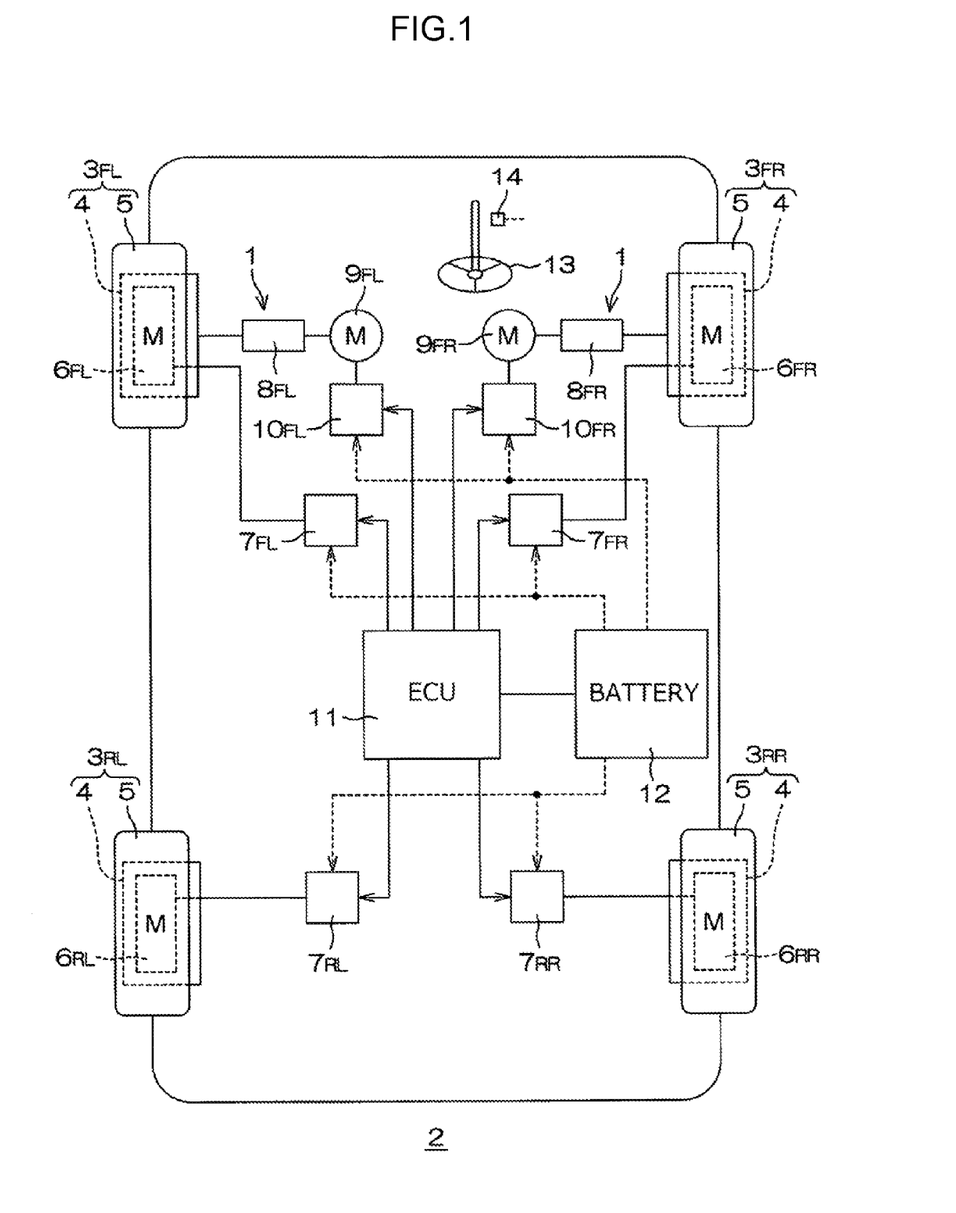
FIG. 1 is a plan view schematically illustrating a driving system in a vehicle in which vehicular steering systems according to a first embodiment of the invention is mounted.

Embodiments of the invention will be described below in detail with reference to the attached drawings. FIG. 1 is a plan view schematically illustrating a driving system in a vehicle 2 in which vehicular steering systems 1 according to a first embodiment of the invention is mounted. In the present embodiment, each of the vehicular steering systems 1 is a vehicular steering system for four-wheel drive vehicle. The vehicle 2 is a four-wheel drive vehicle having four drive wheels: a front right wheel $3_{FR}$, a front left wheel $3_{FL}$, a rear right wheel $3_{RR}$, and a rear left wheel $3_{RL}$ (that may be collectively referred to as "driving wheels 3"). Each of the driving wheels 3 includes a wheel 4 and a tire 5. The front right wheel $3_{FR}$, the front left wheel $3_{FL}$, the rear right wheel $3_{RR}$, and the rear left wheel $3_{RL}$ are independently driven by a front-right-wheel drive actuator $6_{FR}$, a front-left-wheel drive actuator $6_{FL}$, a rear-right-wheel drive actuator $6_{RR}$, and a rear-left-wheel drive actuator $6_{RL}$ (that may be collectively referred to as "wheel drive actuators 6").

Each of the wheel drive actuators 6 is, for example, an in-wheel three-phase AC electric motor (electric motor) assembled in the wheel 4 of the driving wheel 3. The wheel drive actuators 6 are driven by wheel driving inverters $7_{FR}$, $7_{FL}$, $7_{RR}$, and $7_{RL}$ mounted in the vehicle 2 (that may be collectively referred to as "wheel drive inverters 7"). Each of the wheel drive inverters 7 includes a three-phase inverter circuit.

The vehicle 2 includes a front-right-wheel steering operation mechanism $8_{FR}$ and a front-left-wheel steering operation mechanism $8_{FL}$ (that may be collectively referred to as "steering operation mechanisms 8") that are used to steer the front right wheel $3_{FR}$ and the front left wheel $3_{FL}$, respectively. The front-right-wheel steering operation mechanism $8_{FR}$ and the front-left-wheel steering operation mechanism $8_{FL}$ constitute a part of a right and left independent steering operation mechanism that independently steers the front right wheel $3_{FR}$ and the front left wheel $3_{FL}$. A front-right-wheel steering operation actuator $9_{FR}$ and a front-left-wheel steering operation actuator $9_{FL}$ (that may be collectively referred to as "steering operation actuators 9") are coupled to the front-right-wheel steering operation mechanism $8_{FR}$ and the front-left-wheel steering operation mechanism $8_{FL}$, respectively.

In the present embodiment, the front-right-wheel steering operation actuator $9_{FR}$ and the front-left-wheel steering operation actuator $9_{FL}$ are each a three-phase AC electric motor (electric motor). The front-right-wheel steering operation actuator $9_{FR}$ and the front-left-wheel steering operation actuator $9_{FL}$ independently apply a steering operation force that is used to steer the front right wheel $3_{FR}$ and the front left wheel $3_{FL}$, respectively, to the front-right-wheel steering operation mechanism $8_{FR}$ and the front-left-wheel steering operation mechanism $8_{FL}$, respectively. The steering operation actuators 9 are driven by steering operation inverters $10_{FR}$, $10_{FL}$ (that may be collectively referred to as "steering operation inverters 10") mounted in the vehicle 2. Each of the steering operation inverters 10 includes a three-phase inverter circuit.

In the vehicle 2, an electronic control unit (ECU) 11 and a battery 12 are mounted. The battery 12 supplies power to relevant components. The ECU 11 controls the wheel drive inverters 7, the steering operation inverters 10, and the like. The battery 12 supplies power to relevant components. The ECU 11 includes a microcomputer including CPU and memories (such as a ROM, a RAM, and a nonvolatile memory).

The wheel drive inverters 7 convert DC power fed from the battery 12 into AC power and supply the AC power to the respective wheel drive actuators 6. Consequently, the respective wheel drive actuators 6 are driven to rotate the driving wheels 3. Similarly, the steering operation inverters 10 convert DC power fed from the battery 12 into AC power and supply the AC power to the respective steering operation actuators 9. Consequently, the respective steering operation actuators 9 are driven to rotate the driving wheels 3 via the steering operation mechanisms 8.

A steering angle sensor 14 is mounted in the vehicle 2 to detect a steering angle $θ_s$ of a steering wheel 13. The steering angle $θ_s$ detected by the steering angle sensor 14 is input to the ECU 11. The steering operation actuators 9 are controlled based on the steering angle $θ_s$ detected by the steering angle sensor 14. A part of the vehicular steering system 1 includes the driving wheels 3, the wheel drive actuators 6, the wheel drive inverters 7, the steering operation mechanisms 8, the steering operation actuators 9, the steering operation inverters 10, the ECU 11, and the battery 12. A configuration of the vehicular steering system 1 will be specifically described below with reference to FIG. 2. In the vehicle 2, a front right wheel $3_{FR}$-side configuration and a front left wheel $3_{FL}$-side configuration are substantially similar. Thus, the front right wheel $3_{FR}$-side configuration will be described below by way of example. A rear right wheel $3_{RR}$-side configuration and a rear left wheel $3_{RL}$-side configuration are different from the front right wheel $3_{FR}$-side configuration and the front left wheel $3_{FL}$-side configuration in that the steering operation mechanisms 8 and the like are not connected in the rear right wheel $3_{RR}$-side configuration and the rear left wheel $3_{RL}$-side configuration. However, for the remaining part of the configuration, the rear right wheel $3_{RR}$-side configuration and the rear left wheel $3_{RL}$-side configuration are substantially similar to the front right wheel $3_{FR}$-side configuration and the front left wheel $3_{FL}$-side configuration. Thus, the remaining part of the configuration will not be described.

Figure 2:
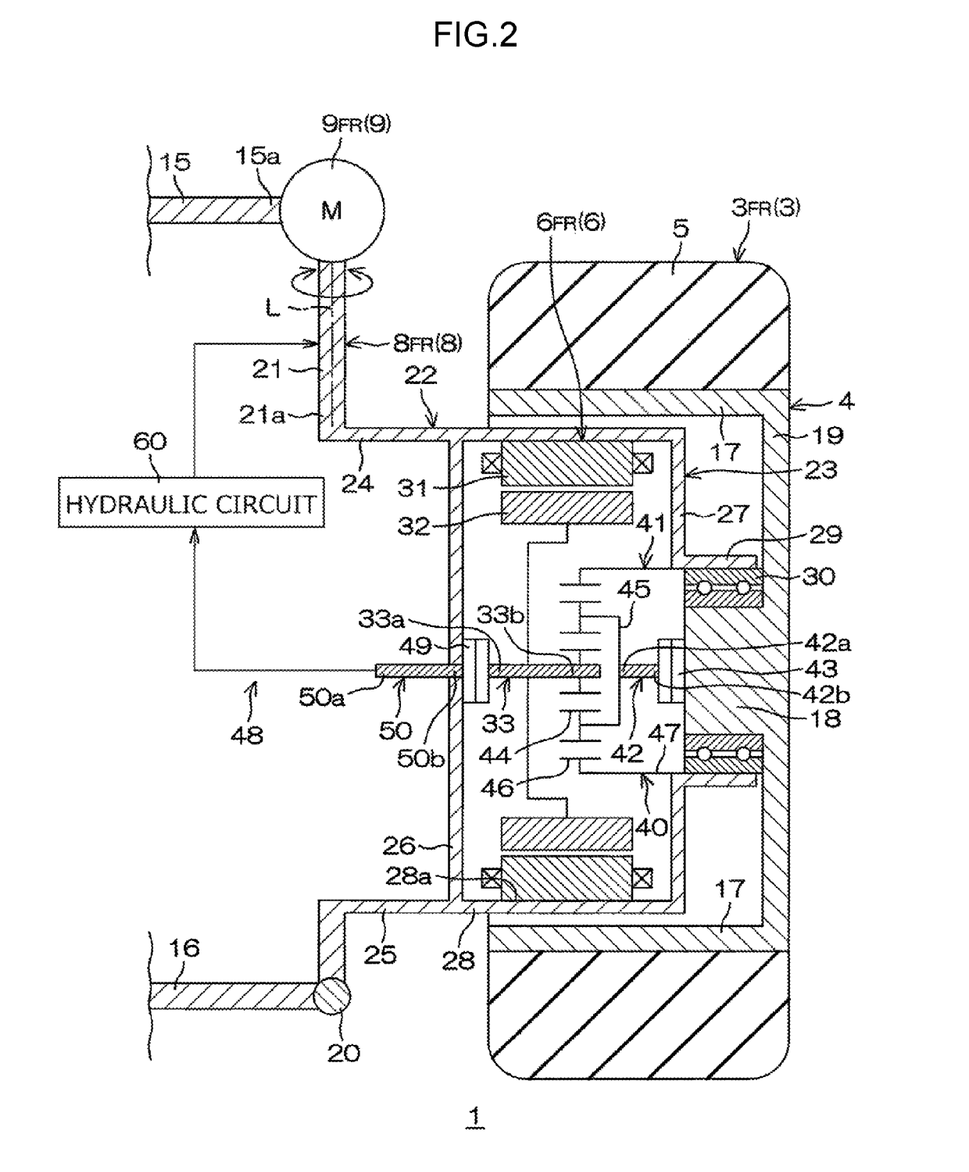
FIG. 2 is a sectional view schematically illustrating a vehicular steering system for a front right wheel depicted in FIG. 1.

FIG. 2 is a sectional view schematically illustrating the vehicular steering system 1 for the front right wheel $3_{FR}$ depicted in FIG. 1. The term "interior" is used to refer to an inner side of the vehicle 2. The term "exterior" is used to refer to an outer side of the vehicle 2. The vehicular steering system 1 includes the above-described front right wheel $3_{FR}$, and an upper arm 15 and a lower arm 16 that support the front right wheel $3_{FR}$. The front right wheel $3_{FR}$ includes the wheel 4 and the tire 5 as described above. More specifically, the wheel 4 of the front right wheel $3_{FR}$ includes a rim 17 and a disc 19. The tire 5 is attached to the rim 17. The disc 19 is attached to the rim 17, and an axle 18 is integrally provided on the disc 19 at a central portion thereof in a radial direction. An interior end (not depicted in the drawings) of the upper arm 15 and an interior end (not depicted in the drawings) of the lower arm 16 are supported, for example, so as to be movable relative to a vehicle body (not depicted in the drawings). The above-described front-right-wheel steering operation actuator $9_{FR}$ is coupled to an exterior end 15a of the upper arm 15.

The above-described front-right-wheel steering operation mechanism $8_{FR}$ is coupled to the front-right-wheel steering operation actuator $9_{FR}$. The front-right-wheel steering operation mechanism $8_{FR}$ includes a steered shaft 21 and a wheel support member 22. The steered shaft 21 is integrated with an output shaft of the front-right-wheel steering operation actuator $9_{FR}$. The wheel support member 22 is attached to the steered shaft 21 to support the front right wheel $3_{FR}$. The steered shaft 21 is provided so as to extend from the upper arm 15 toward the lower arm 16. The steered shaft 21 may be provided separately from and coupled to the output shaft of the front-right-wheel steering operation actuator $9_{FR}$.

The wheel support member 22 includes a motor housing 23, a coupling portion 24, and a coupling portion 25. The coupling portion 24 couples the motor housing 23 to the steered shaft 21. The coupling portion 25 couples the motor housing 23 to the lower arm 16 via a ball joint 20. The coupling portion 24 of the wheel support member 22 is attached to a lower end 21a of the steered shaft 21 (an end of the steered shaft 21 opposite to the front-right-wheel steering operation actuator $9_{FR}$). The coupling portion 24 of the wheel support member 22 may be integrated with the lower end 21a of the steered shaft 21.

The motor housing 23 includes a disc-shaped disc portion 26, a flat-circular-ring-shaped annular portion 27, and a cylinder-shaped cylindrical portion 28. The disc portion 26 is opposed to the disc 19. The annular portion 27 is disposed on the exterior side with respect to the disc portion 26 so as to be opposed to the disc portion 26. The cylindrical portion 28 couples an outer peripheral edge of the disc portion 26 and an outer peripheral edge of the annular portion 27 together. A cylindrical protruding portion 29 protruding toward the exterior side is provided at an inner peripheral edge of the annular portion 27. A bearing 30 is disposed between an inner peripheral surface of the protruding portion 29 and the axle 18.

That is, the front right wheel $3_{FR}$ is rotatably supported by the wheel support member 22 via the bearing 30. The wheel support member 22 is supported by the upper arm 15 so as to able to turn around a turning axis L using the steered shaft 21 as a turning center. Therefore, the wheel support member 22 is turned to steer the front right wheel $3_{FR}$. The front-right-wheel drive actuator $6_{FR}$ is housed in the motor housing 23 of the wheel support member 22.

The front-right-wheel drive actuator $6_{FR}$ includes a stator 31, a rotor 32, and a motor shaft 33. The stator 31 is fixed to an inner peripheral surface 28a of the cylindrical portion 28 of the motor housing 23. The rotor 32 is disposed radially inward of the stator 31. The motor shaft 33 is fixed to the rotor 32. The motor shaft 33 has an interior end 33a and an exterior end 33b. The stator 31 has stator windings including a U-phase winding, a V-phase winding, and a W-phase winding corresponding to a U phase, a V phase, and a W phase of the front-right-wheel drive actuator $6_{FR}$.

The vehicular steering system 1 is provided between the front-right-wheel drive actuator $6_{FR}$ and the front right wheel $3_{FR}$. The vehicular steering system 1 includes a first power transmission mechanism 40 that transmits a rotational driving force of the front-right-wheel drive actuator $6_{FR}$ to the front right wheel $3_{FR}$. More specifically, the first power transmission mechanism 40 includes the above-described motor shaft 33, a reduction gear 41, an output shaft 42, and a first clutch 43. The reduction gear 41 increases torque of the motor shaft 33. The torque increased by the reduction gear 41 is transmitted to the output shaft 42. The first clutch 43 couples the output shaft 42 and the axle 18 together. The output shaft 42 has an interior end 42a and an exterior end 42b. The output shaft 42 is disposed coaxially with the motor shaft 33 so as to be rotatable relative to the motor shaft 33.

The reduction gear 41 includes a sun gear 44 and a carrier 45. The sun gear 44 is coupled to an end 33b of the motor shaft 33 so as to be rotatable integrally with the motor shaft 33. The carrier 45 is coupled to the end 42a of the output shaft 42 so as to be rotatable integrally with the output shaft 42. The reduction gear 41 further includes a planetary gear 46 and a ring gear 47. The planetary gear 46 couples the sun gear 44 and the carrier 45 together. The ring gear 47 is fixed to the motor housing 23 to support the planetary gear 46 so that the planetary gear 46 is rotatable. In the present embodiment, the ring gear 47 is fixed to the annular portion 27 of the motor housing 23.

The first clutch 43 is provided between the exterior end 42b of the output shaft 42 and the axle 18. The first clutch 43 is, for example, an electromagnetic clutch that permits and cuts off transmission of the rotational driving force of the front-right-wheel drive actuator $6_{FR}$ to the front right wheel $3_{FR}$. More specifically, the first clutch 43 is controllably switched between an engaged state where the first clutch 43 engages the output shaft 42 with the axle 18 to transmit the torque of the output shaft 42 to the axle 18 and a released state where the first clutch 43 releases the engagement between the output shaft 42 and the axle 18 to cut off transmission of the torque of the output shaft 42 to the axle 18.

The vehicular steering system 1 further includes a second power transmission mechanism 48 provided between the front-right-wheel drive actuator $6_{FR}$ and the front-right-wheel steering operation mechanism $8_{FR}$ to transmit the rotational driving force of the front-right-wheel drive actuator $6_{FR}$ to the front-right-wheel steering operation mechanism $8_{FR}$. More specifically, the second power transmission mechanism 48 includes the motor shaft 33, a second clutch 49, and a power transmission shaft 50. The second clutch 49 is coupled to the motor shaft 33. The power transmission shaft 50 is coupled to the motor shaft 33 via the second clutch 49. The second power transmission mechanism 48 further includes a hydraulic circuit 60 connected to the power transmission shaft 50 to transmit the rotational driving force of the front-right-wheel drive actuator $6_{FR}$ to the front-right-wheel steering operation mechanism $8_{FR}$ via hydraulic oil.

In the present embodiment, the second clutch 49 is disposed in the motor housing 23 and coupled to the interior end 33a of the motor shaft 33 in the motor housing 23. The power transmission shaft 50 has an interior end 50a and an exterior end 50b, and is disposed coaxially with the motor shaft 33. The exterior end 50b of the power transmission shaft 50 penetrates the disc portion 26 of the motor housing 23, and is coupled to the second clutch 49.

The second clutch 49 is, for example, an electromagnetic clutch that permits and cuts off transmission of the rotational driving force of the front-right-wheel drive actuator $6_{FR}$ to the hydraulic circuit 60. More specifically, the second clutch 49 is controllably switched between an engaged state where the second clutch 49 engages the motor shaft 33 with the power transmission shaft 50 to transmit the torque of the motor shaft 33 to the hydraulic circuit 60 via the power transmission shaft 50 and a released state where the second clutch 49 releases the engagement between the motor shaft 33 and the power transmission shaft 50 to cut off transmission of the torque of the motor shaft 33 to the power transmission shaft 50.

Figure 3:
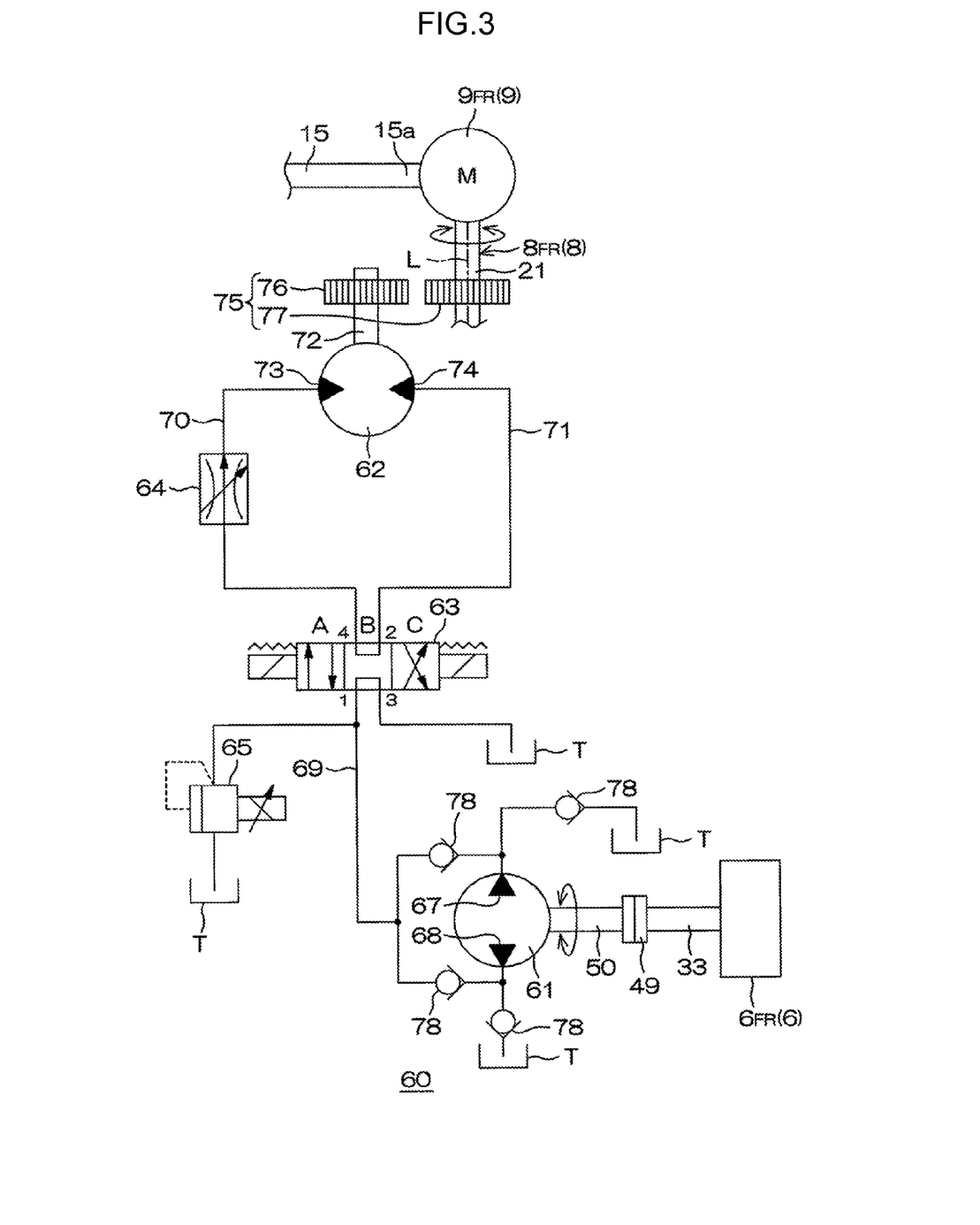
FIG. 3 is a schematic diagram of a hydraulic circuit depicted in FIG. 2.

A configuration of the hydraulic circuit 60 will be specifically described below with reference to FIG. 3. FIG. 3 is a schematic diagram of the hydraulic circuit 60 depicted in FIG. 2. The hydraulic circuit 60 includes a hydraulic pump 61, a hydraulic actuator 62, a directional control valve 63 (directional control unit), a flow control valve 64, a pressure control valve 65, tanks $T_s$ a plurality of oil paths 69, 70, 71, and a plurality of check valves 78. The directional control valve 63 controls a direction in which the hydraulic oil flows. The flow control valve 64 controls the flow rate of the hydraulic oil. The pressure control valve 65 controls the pressure of the hydraulic oil. A first tank and a second tank of the tanks T are connected to the directional control valve 63 and the pressure control valve 65, respectively.

The hydraulic pump 61 is coupled to the power transmission shaft 50 and driven by torque of the power transmission shaft 50. A third tank and a fourth tank of the tanks T and the first oil path 69 are connected to the hydraulic pump 61. More specifically, the hydraulic pump 61 includes a first port 67 and a second port 68. The first oil path 69 is connected to the first port 67 and to the second port 68 via the respective check valves 78. The third and fourth tanks T are connected to the first port 67 and to the second port 68, respectively, via the respective check valves 78. When the torque of the power transmission shaft 50 is transmitted to the hydraulic pump 61, the hydraulic pump 61 discharges the hydraulic oil from one of the third and fourth tanks T corresponding to a rotating direction of the power transmission shaft 50 toward the first oil path 69.

The hydraulic actuator 62 is coupled to the front-right-wheel steering operation mechanism $8_{FR}$. The hydraulic actuator 62 rotationally drives the front-right-wheel steering operation mechanism $8_{FR}$ using the hydraulic oil fed from the hydraulic pump 61. More specifically, the hydraulic actuator 62 includes an output shaft 72, a first port 73 to which the second oil path 70 is connected, and a second port 74 to which the third oil path 71 is connected. For example, when the hydraulic oil flows from the first port 73 toward the second port 74, torque acting in a forward rotating direction is generated in the hydraulic actuator 62. Consequently, the output shaft 72 of the hydraulic actuator 62 rotates forward. In contrast, when the hydraulic oil flows from the second port 74 toward the first port 73, torque acting in a direction opposite to the direction of the forward rotation is generated in the hydraulic actuator 62. Thus, the output shaft 72 of the hydraulic actuator 62 rotates backward. On the other hand, when no hydraulic oil flows through the first port 73 or the second port 74, no torque is generated in the hydraulic actuator 62. Therefore, no torque is transmitted to the output shaft 72 of the hydraulic actuator 62.

In the present embodiment, the forward and backward torques of the output shaft 72 of the hydraulic actuator 62 are transmitted to the front-right-wheel steering operation mechanism $8_{FR}$ via an output transmission mechanism 75. More specifically, the output transmission mechanism 75 includes a first gear 76 and a second gear 77. The first gear 76 is attached to the output shaft 72 of the hydraulic actuator 62 so as to rotate integrally with the output shaft 72. The second gear 77 is integrally rotatably attached to the steered shaft 21 so as to mesh with the first gear 76 and rotate integrally with the steered shaft 21. The forward and backward torques of the output shaft 72 are applied to the steered shaft 21 via the first gear 76 and the second gear 77.

The directional control valve 63 is interposed between the hydraulic pump 61 and the hydraulic actuator 62. In the present embodiment, the directional control valve 63 is a four-port three-position selector valve that has a first port, a second port, a third port, and a fourth port (FIG. 3 depicts only numbers corresponding to the ports) and that can be switched between a forward position (driving position) and a neutral position B and a backward position C (driving portion). The directional control valve 63 may be, for example, a normally closed solenoid valve (that is normally in the neutral position B).

The hydraulic pump 61 is connected to the first port of the directional control valve 63 via the first oil path 69. The second port 74 of the hydraulic actuator 62 is connected to the second port of the directional control valve 63 via the third oil path 71. The first tank T is connected to the third port of the directional control valve 63. The first port 73 of the hydraulic actuator 62 is connected to the fourth port of the directional control valve 63 via the second oil path 70.

The directional control valve 63 switches the direction in which the hydraulic oil flows into the hydraulic actuator 62. More specifically, when the directional control valve 63 is in the forward position A, the hydraulic oil flows into the first port 73 of the hydraulic actuator 62 via the second oil path 70. The hydraulic oil discharged into the third oil path 71 through the second port 74 of the hydraulic actuator 62 is fed to the first tank T via the directional control valve 63.

On the other hand, when the directional control valve 63 is in the backward position C, the hydraulic oil flows into the second port 74 of the hydraulic actuator 62 via the third oil path 71. The hydraulic oil discharged into the second oil path 70 through the first port 73 of the hydraulic actuator 62 is fed to the first tank T via the directional control valve 63. On the other hand, when the directional control valve 63 is in the neutral position B, the hydraulic oil discharged into the first oil path 69 from the hydraulic pump 61 flows into the first tank T via the directional control valve 63. In other words, no hydraulic oil flows into the first port 73 or the second port 74 of the hydraulic actuator 62.

The flow control valve 64 is interposed in the second oil path 70 to throttle the second oil path 70 to control the flow rate of the hydraulic oil. The pressure control valve 65 is connected in parallel with the first oil path 69 to divert an excess portion of the hydraulic oil flowing through the first oil path 69 into the second tank T. Consequently, the pressure control valve 65 controls the pressure of the hydraulic oil flowing into the hydraulic actuator 62. In the vehicular steering system 1, when the motor shaft 33 is rotationally driven with the first clutch 43 engaged and with the second clutch 49 released, the torque of the motor shaft 33 is increased by the reduction gear 41, and the increased torque is transmitted to the output shaft 42. The torque transmitted to the output shaft 42 is transmitted to the axle 18 via the first clutch 43. Thus, the front right wheel $3_{FR}$ is rotationally driven. At this time, since the second clutch 49 is in the released state, the torque of the motor shaft 33 is not transmitted to the hydraulic pump 61.

On the other hand, when the motor shaft 33 is rotationally driven with the first clutch 43 released and with the second clutch 49 engaged, the torque of the motor shaft 33 is transmitted to the power transmission shaft 50 via the second clutch 49. The torque transmitted to the power transmission shaft 50 is transmitted to the hydraulic pump 61. When the torque of the power transmission shaft 50 transmitted to the hydraulic pump 61, the hydraulic oil is fed to the directional control valve 63.

When the directional control valve 63 is placed in the forward position A, the hydraulic actuator 62 rotates forward. When the directional control valve 63 is placed in the neutral position B, the hydraulic actuator 62 does not rotate. When the directional control valve 63 is placed in the backward position C, the hydraulic actuator 62 rotates backward. The forward and backward torques of the hydraulic actuator 62 are applied to the front-right-wheel steering operation mechanism $8_{FR}$ as steering operation forces. Consequently, the front right wheel $3_{FR}$ is steered in a direction corresponding to the forward or backward torque of the hydraulic actuator 62. At this time, the steering operation force applied to the front-right-wheel steering operation mechanism $8_{FR}$ via the hydraulic oil may be adjusted by adjusting the rotational driving force of the front-right-wheel steering operation actuator $9_{FR}$.

Even when the motor shaft 33 is rotationally driven with the first clutch 43 engaged and with the second clutch 49 engaged, the rotational driving force of the front-right-wheel drive actuator $6_{FR}$ can be applied to the front-right-wheel steering operation mechanism $8_{FR}$ as a steering operation force by controlling the directional control valve 63, the flow control valve 64, the pressure control valve 65, and the like in the hydraulic circuit 60.

When the front-right-wheel steering operation mechanism $8_{FR}$ is not driven by the hydraulic actuator 62, in other words, when the directional control valve 63 is in the neutral position B, the second clutch 49 is preferably in the released state. In this case, the rotational driving force of the motor shaft 33 is not transmitted to the hydraulic pump 61. In other words, since driving of the hydraulic circuit can be stopped, it is possible to suppress consumption of the rotational driving force (energy) of the front-right-wheel drive actuator $6_{FR}$ by the hydraulic circuit 60.

In the present embodiment, the hydraulic circuit 60 can be driven by engaging the second clutch 49. Consequently, the rotational driving force of the front-right-wheel drive actuator $6_{FR}$ can be applied to the front-right-wheel steering operation mechanism $8_{FR}$ (steered shaft 21) via the hydraulic oil as a steering operation force that is used to steer the front right wheel $3_{FR}$. In other words, in addition to the steering operation force of the front-right-wheel steering operation actuator $9_{FR}$, the rotational driving force of the front-right-wheel drive actuator $6_{FR}$ can be applied to the front-right-wheel steering operation mechanism $8_{FR}$ (steered shaft 21) as a steering operation force. This enables a reduction in power that needs to be provided by the front-right-wheel steering operation actuator $9_{FR}$. As a result, the size of the front-right-wheel drive actuator 6 can be reduced. This in turn enables the front right wheel $3_{FR}$ to be steered by only the rotational driving force of the front-right-wheel drive actuator $6_{FR}$.

In the present embodiment, the hydraulic circuit 60 includes the directional control valve 63 that can be switched between the forward position A and the neutral position B and the backward position C. This enables the driving direction of the hydraulic actuator 62 to be changed and allows the hydraulic actuator 62 to be driven or stopped. In the present embodiment, the second power transmission mechanism 48 includes the second clutch 49 that permits or cuts off transmission of the rotational driving force of the front-right-wheel drive actuator $6_{FR}$ to the hydraulic circuit 60. Therefore, when the rotational driving force of the front-right-wheel drive actuator $6_{FR}$ is not transmitted to the front-right-wheel steering operation mechanism $8_{FR}$ (steered shaft 21), driving of the hydraulic circuit 60 can be stopped by releasing the second clutch 49. This prevents transmission of the rotational driving force of the front-right-wheel drive actuator 6 to the front-right-wheel steering operation mechanism $8_{FR}$ (steered shaft 21) via the hydraulic oil when the front-right-wheel steering operation mechanism $8_{FR}$ (steered shaft 21) is not steered. Consequently, energy consumption can be suppressed.

The rotational driving force of the front-right-wheel drive actuator $6_{FR}$ can be applied to the front-right-wheel steering operation mechanism $8_{FR}$ (steered shaft 21), for example, as a steering operation assist force during stationary steering of the front right wheel $3_{FR}$. The "stationary steering" refers to steering of the front right wheel $3_{FR}$ performed while the vehicle 2 is stopped. With reference to FIGS. 1 to 3, an example will be described where a steering operation assist force is applied to the front-right-wheel steering operation mechanism $8_{FR}$ (steered shaft 21) during stationary steering.

Whether or not the stationary steering is being performed is determined by whether or not the steering wheel 13 is being steered while the vehicle 2 is stopped. More specifically, the determination is made depending on whether or not the absolute value $|V_s|$ of a steering speed $V_s$ of the steering wheel 13 output from the steering angle sensor 14 is equal to or larger than a predetermined threshold $V_{th}$ that is larger than zero ($|V_s|>V_{th}>0$).

When the absolute value $|V_s|$ of the steering speed $V_s$ is determined to be equal to or larger than the threshold $V_{th}$ ($|V_s|>V_{th}$) while the vehicle 2 is stopped, it is determined that the "stationary steering" is being performed, and a steering operation assist force is applied to the front-right-wheel steering operation mechanism $8_{FR}$. Whether or not stationary steering is being performed may be determined by whether or not the absolute value $|T_s|$ of a steering torque $T_s$ output from a torque sensor not depicted in the drawings is equal to or larger than a predetermined threshold $T_{th}$ that is larger than zero ($|T_s|T_{th}>0$).

Before a steering operation assist force is applied to the front-right-wheel steering operation mechanism $8_{FR}$ (steered shaft 21), first, the first clutch 43 is released, and the second clutch 49 is engaged. Next, the front-right-wheel steering operation actuator $9_{FR}$ is driven and the front-right-wheel drive actuator $6_{FR}$, the directional control valve 63, and the like are driven, in a direction in which the front right wheel $3_{FR}$ is steered. In other words, the front-right-wheel drive actuator $6_{FR}$ is driven in such a direction that the steering operation assist force is increased.

Thus, during the stationary steering of the front right wheel $3_{FR}$, the torque of the front-right-wheel drive actuator $6_{FR}$ is applied to the front-right-wheel steering operation mechanism $8_{FR}$ (steered shaft 21) as a steering operation assist force. At this time, since the first clutch 43 is in the released state, the rotational driving force of the front-right-wheel drive actuator $6_{FR}$ is not transmitted to the front right wheel $3_{FR}$. However, since the vehicle 2 is stopped, the released state of the first clutch 43 does not affect the traveling of the vehicle 2.

When the rotational driving force of the front-right-wheel drive actuator $6_{FR}$ is applied to the front-right-wheel steering operation mechanism $8_{FR}$ (steered shaft 21) as a steering operation assist force, torque steer of the front right wheel $3_{FR}$ can be reduced which may occur during braking of the vehicle 2. In other words, torque steer compensation can be performed by utilizing the rotational driving force of the front-right-wheel drive actuator $6_{FR}$. The "torque steer" refers to a phenomenon in which the steering wheel 13 is steered from the front right wheel $3_{FR}$ side by a steering force generated in the front right wheel $3_{FR}$. With reference to FIGS. 1 to 3, an example of the torque steer compensation during braking of the vehicle 2 will be described below.

Whether or not the vehicle 2 is being braked may be determined using a vehicle speed sensor, an acceleration sensor, or the like (not depicted in the drawings) mounted in the vehicle 2. When the vehicle 2 is determined to be being braked, the torque steer compensation is performed. Before the torque steer compensation is performed, first, the first clutch 43 is released, and the second clutch 49 is engaged. Next, the front-right-wheel steering operation actuator $9_{FR}$ is driven and the front-right-wheel drive actuator $6_{FR}$, the directional control valve 63, and the like are driven, in such a direction that the torque steer is reduced.

Thus, the torque of the front-right-wheel drive actuator $6_{FR}$ is applied to the front-right-wheel steering operation mechanism $8_{FR}$ (steered shaft 21) as a steering operation assist force to perform the torque steer compensation on the front right wheel $3_{FR}$. At this time, since the first clutch 43 is in the released state, the rotational driving force of the front-right-wheel drive actuator $6_{FR}$ is not transmitted to the front right wheel $3_{FR}$. However, since the vehicle 2 is being braked, the released state of the first clutch 43 does not affect the traveling of the vehicle 2. For the torque steer compensation, both the first clutch 43 and the second clutch 49 may be engaged to allow driving of the front-right-wheel drive actuator $6_{FR}$to.

In particular, during the stationary steering of the front right wheel $3_{FR}$ or during the torque steer compensation on the front right wheel $3_{FR}$, the front-right-wheel steering operation actuator $9_{FR}$ needs to provide relatively high power. However, as described above, the steering operation assist force exerted by the front-right-wheel drive actuator $6_{FR}$ is applied to the front-right-wheel steering operation mechanism $8_{FR}$ (steered shaft 21). This allows the use of a small-sized front-right-wheel drive actuator $6_{FR}$ with relatively low power.

Figure 4:
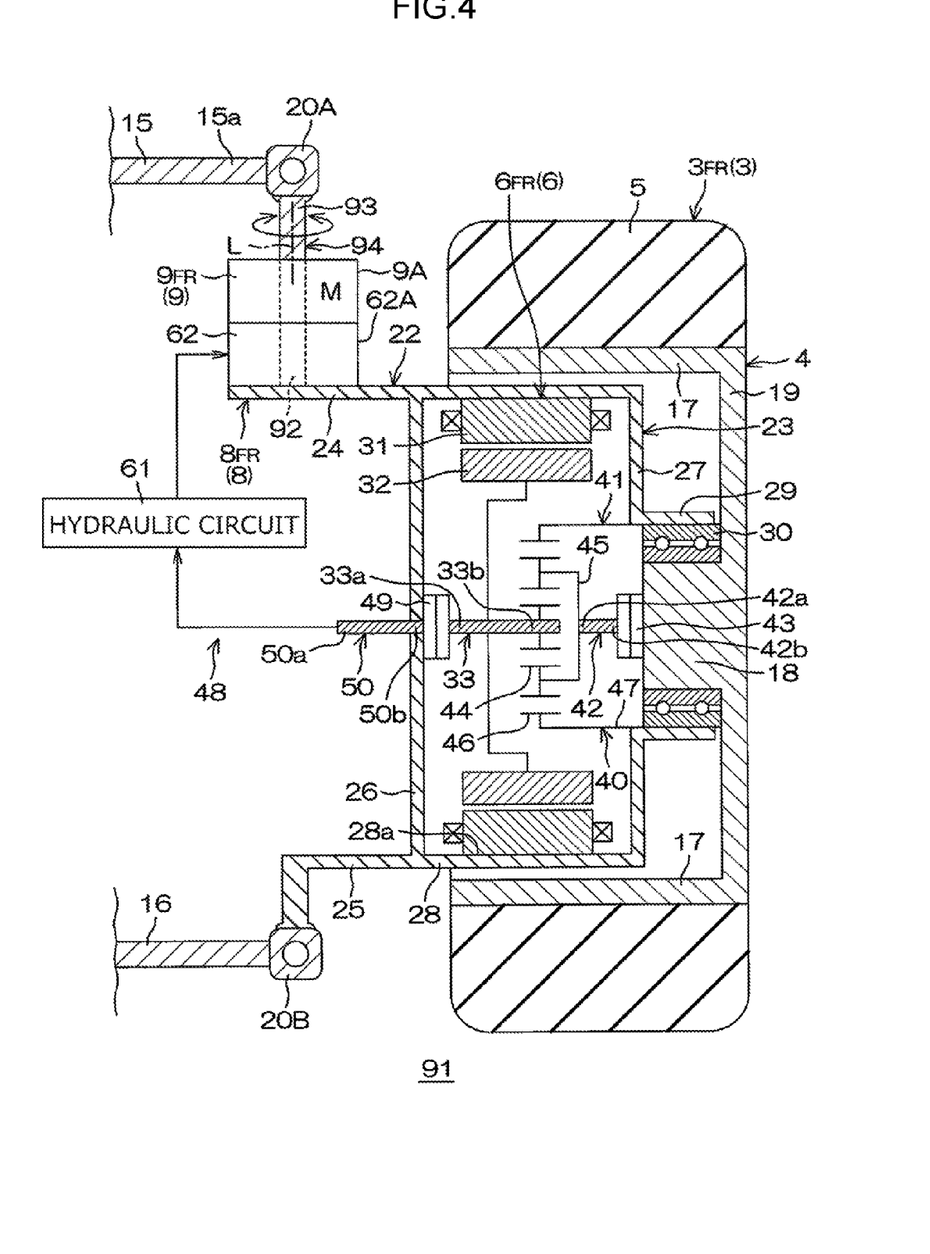
FIG. 4 is a sectional view illustrating a vehicular steering system according to a second embodiment of the invention.

FIG. 4 is a sectional view schematically illustrating a vehicular steering system 91 according to a second embodiment of the invention. In FIG. 4, components corresponding to those depicted in FIGS. 1 to 3 are denoted by the same reference numerals and description thereon will be omitted. In the above-described vehicular steering system 1, the forward and backward torques of the output shaft 72 of the hydraulic actuator 62 are applied to the front-right-wheel steering operation mechanism $8_{FR}$ (steered shaft 21) via the output transmission mechanism 75. In the present embodiment, the output shaft of the front-right-wheel steering operation actuator $9_{FR}$ is coaxially coupled to the output shaft of the hydraulic actuator 62. Consequently, the torque of the front-right-wheel steering operation actuator $9_{FR}$ and the torque of the hydraulic actuator 62 are transmitted to the front-right-wheel steering operation mechanism $8_{FR}$.

More specifically, the hydraulic actuator 62 includes a housing 62A and an output shaft 92, and is disposed on the wheel support member 22 so as to face upward. The housing 62A of the hydraulic actuator 62 is fixed to the coupling portion 24 of the wheel support member 22. The front-right-wheel steering operation actuator $9_{FR}$ includes a housing 9A and an output shaft 93 and is disposed on the hydraulic actuator 62 so as to face upward. The housing 9A of the front-right-wheel steering operation actuator $9_{FR}$ is fixed to the housing 62A of the hydraulic actuator 62.

The output shaft 92 of the hydraulic actuator 62 is integrated with the output shaft 93 of the front-right-wheel steering operation actuator $9_{FR}$. The output shaft 93 of the front-right-wheel steering operation actuator $9_{FR}$ is coupled to the exterior end 15a of the upper arm 15 via a universal joint 20A so as to be non-rotatable. As described above, the front-right-wheel steering operation actuator $9_{FR}$ and the hydraulic actuator 62 have a common output shaft 94 into which the output shaft 92 and the output shaft 93 are integrated.

Unlike in the first embodiment, the front-right-wheel steering operation mechanism $8_{FR}$ does not include the steered shaft 21. In the second embodiment, the coupling portion 25 of the front-right-wheel steering operation mechanism $8_{FR}$ is coupled to the lower arm 16 via a universal joint 20B also serving as a ball joint. In other words, the universal joints 20A, 20B support the wheel support member 22 such that the wheel support member 22 is movable up and down along an axial direction of the output shaft 94.

When the front-right-wheel steering operation actuator $9_{FR}$ is driven, the housing 9A turns around the turning axis L integrally with the wheel support member 22 and the hydraulic actuator 62 by use of the output shaft 94 as a turning center. On the other hand, when the hydraulic actuator 62 is driven, the housing 62A turns around the turning axis L integrally with the wheel support member 22 and the front-right-wheel steering operation actuator $9_{FR}$ by use of the output shaft 94 as the turning center.

In other words, the wheel support member 22 turns around the turning axis L by use of the output shaft 94 as the turning center, due to driving of the front-right-wheel steering operation actuator $9_{FR}$ and/or driving of the hydraulic actuator 62. Consequently, the front right wheel $3_{FR}$ is steered. This configuration can produce effects similar to the effects described in the first embodiment. The front-right-wheel steering operation actuator $9_{FR}$ and the hydraulic actuator 62 may be reversely disposed.

The embodiment of the invention has been described. However, the invention may further be implemented in other forms. For example, in the above-described embodiments, the examples have been described where the configuration is adopted in which the steering operation assist force can be exerted for the front right wheel $3_{FR}$ and the front left wheel $3_{FL}$. However, a configuration similar to that for the front right wheel $3_{FR}$ and the front left wheel $3_{FL}$ may be adopted for the rear right wheel $3_{RR}$ and the rear left wheel $3_{RF}$ to allow the steering operation assist force to be exerted.

In the above-described embodiments, the examples have been described where the reduction gear 41 is connected to the front-right-wheel drive actuator $6_{FR}$. However, the reduction gear 41 may not be provided, and the interior end 33a of the motor shaft 33 may be connected directly to the second clutch 49, and the exterior end 33b of the motor shaft 33 may be connected directly to the first clutch 43. In this case, the rotational driving force of the front-right-wheel drive actuator $6_{FR}$ is transmitted to the axle 18 or the power transmission shaft 50 via only the motor shaft 33. In this configuration, the first power transmission mechanism 40 includes the motor shaft 33 and the first clutch 43. The second power transmission mechanism 48 includes the motor shaft 33, the second clutch 49, the power transmission shaft 50, and the hydraulic circuit 60.

In the above-described embodiments, the interior end 33a of the motor shaft 33 may be connected directly to the hydraulic pump 61, and the exterior end 33b of the motor shaft 33 may be connected directly to the axle 18. Such a configuration allows control of the directional control valve 63, the flow control valve 64, the pressure control valve 65, and the like in the hydraulic circuit 60. This allows the rotational driving force of the front-right-wheel drive actuator $6_{FR}$ to be applied to the front-right-wheel steering operation mechanism $8_{FR}$ (steered shaft 21) as a steering operation force. In this configuration, the first power transmission mechanism 40 includes the motor shaft 33, and the second power transmission mechanism 48 includes the motor shaft 33 and the hydraulic circuit 60.

Various other changes may be made to the embodiments within the scope of the matters set forth in the claims.

What is claimed is:

1. A vehicular steering system comprising:
   a driving wheel;
   a wheel drive actuator that applies a rotational driving force to the driving wheel;
   a steering operation mechanism that steers the driving wheel;
   a steering operation actuator that applies a steering operation force that is used to steer the driving wheel to the steering operation mechanism; and
   a hydraulic circuit that transmits the rotational driving force of the wheel drive actuator to the steering operation mechanism via hydraulic oil as a steering operation force.

2. The vehicular steering system according to claim 1, wherein the hydraulic circuit includes:
   a hydraulic pump that is driven by a rotational driving force of the wheel drive actuator;
   a hydraulic actuator that is driven by the hydraulic oil fed from the hydraulic pump to apply a steering operation force to the steering operation mechanism; and
   a directional control unit that switches a flow direction of the hydraulic oil between a driving position where a driving force acting in a predetermined direction is applied to the hydraulic actuator and a neutral position where no driving force is applied to the hydraulic actuator.

3. The vehicular steering system according to claim 1, further comprising:
   a clutch that permits and cuts off transmission of the rotational driving force of the wheel drive actuator to the hydraulic circuit.

4. The vehicular steering system according to claim 2, further comprising:
   a clutch that permits and cuts off transmission of the rotational driving force of the wheel drive actuator to the hydraulic circuit.

* * * * *